United States Patent [19]
Dumoulin

[11] Patent Number: 5,060,248
[45] Date of Patent: Oct. 22, 1991

[54] SCANNING ANALYSIS AND IMAGING SYSTEM WITH MODULATED ELECTRO-MAGNETIC ENERGY SOURCE

[75] Inventor: Charles L. Dumoulin, Ballston Lake, N.Y.

[73] Assignee: General Electric Company, Schenectady, N.Y.

[21] Appl. No.: 546,281

[22] Filed: Jun. 29, 1990

[51] Int. Cl.$^5$ .................................. G01N 23/06
[52] U.S. Cl. ........................... 378/53; 378/51; 378/43; 250/306; 250/308
[58] Field of Search ............. 378/53, 51, 58, 43; 250/306, 307, 308

[56] References Cited

U.S. PATENT DOCUMENTS

| | | | |
|---|---|---|---|
| 4,798,989 | 1/1989 | Miyazaki et al. | 250/306 |
| 4,837,435 | 6/1989 | Sakuhara et al. | 250/307 |
| 4,870,352 | 9/1989 | Koechner | 250/306 |
| 4,874,945 | 10/1989 | Ohi | 250/306 |
| 4,877,957 | 10/1989 | Okada et al. | 250/306 |
| 4,914,293 | 4/1990 | Hayashi et al. | 250/306 |
| 4,921,346 | 5/1990 | Tokumoto et al. | 250/306 |
| 4,941,753 | 7/1990 | Wickramasinghe | 250/307 |
| 4,952,857 | 8/1990 | West et al. | 250/306 |

*Primary Examiner*—Janice A. Howell
*Assistant Examiner*—Kim-Kwok Chu
*Attorney, Agent, or Firm*—Lawrence P. Zale; James C. Davis, Jr.; Marvin Snyder

[57] ABSTRACT

A scanning spectral-analysis micro-probe subsystem, for a surface imaging system, utilizes a micro-probe to detect the precise position of a point on a sample object surface having surface dimensions changing responsive to surface absorption of incident radiation from a modulated radiation source. The modulated incident radiation causes the sample region dimensions, in the vicinity of the micro-probe, to be modulated, so that the micro-probe detects this dimensional modulation, with a detected modulation strength directly proportional to the incident radiation absorption.

27 Claims, 3 Drawing Sheets

SCANNING ANALYSIS AND IMAGING SYSTEM WITH MODULATED ELECTRO-MAGNETIC ENERGY SOURCE

BACKGROUND OF THE INVENTION

The present invention relates to apparatus for analyzing the surface of a sample of interest and, more particularly, to novel scanning micro-probe imaging subsystems for analyzing the properties of a surface of a sample of interest and obtaining a spectral analysis thereof by utilizing a modulated radiation beam to measure the spectral response of a region which is smaller than the wavelength of the illuminating radiation spectrum.

Several detection methods have been proposed for use in scanning micro-probe imaging systems. The original micro-probe method utilized tunneling current as a measure of the proximity of the probe tip to one minute portion the surface of interest. Other methods have utilized measurements of the probe strain to map each small point on the adjacent surface. In none of the methods is a spectroscopic analysis of the surface characterization provided. It is known to extract spectroscopic information from a large (e.g. approximate 1 square cm.) area of a surface with a relatively new technology known as photoacoustic spectroscopy, which exploits the fact that an object heats up upon absorbing radiation and, if the radiation is pulsed, the heat absorbed by the object will be released in a pulsed fashion to the object's environment. In photoacoustic spectrometers, modulated surface heat transferred to an adjacent gas, typically air, is sufficient to cause detectable sound waves, provided by physical displacement of the gas at the modulation frequency rate. Thus, if the incident light wavelength is changed during data acquisition, the absorption spectrum from the surface point can be detected, although a major problem of photoacoustic spectroscopy is that its sensitivity is not great and does not allow photoacoustic spectroscopy to be well suited for sample analysis, even though this form of spectroscopy has proven extremely useful for spectroscopic analysis of non-transparent objects and especially object surfaces which would otherwise be impossible to analyze, provided a sample is of sufficiently large size. Accordingly, a scanning micro-probe spectral analysis imaging system utilizing a modulated radiation beam for detecting surface property changes to provide sample of surface information, and particularly spectroscopic information, is highly desirable.

BRIEF SUMMARY OF THE INVENTION

In accordance with the invention, a scanning spectral-analysis micro-probe subsystem, for a surface imaging system, utilizes a micro-probe to detect the precise position of a point on a sample object surface having surface dimensions changing responsive to surface absorption of incident radiation from a modulated radiation source. The modulated incident radiation causes the sample region dimensions, in the vicinity of the micro-probe, to be modulated, so that the micro-probe detects this dimensional modulation, with a detected modulation strength directly proportional to the incident radiation absorption.

In a first presently preferred embodiment, the nature of the detection phenomenon (i.e. tunneling current, strain, and the like) used in the micro-probe scanning device is chosen to provide optimum sample surface determination. Preferably, a monochromatic light source is used to generate a chopped light beam, which provides a micro-probe output for phase-insensitive amplification and synchronization. The phase-sensitive circuitry output is thus proportional to the absorption of the chosen illumination wavelength by the sample surface. A surface image is constructed by moving the probe across the sample in raster fashion, to measure the absorption at each point on the surface. Advantageously, the incident radiation wavelength is changed (by tuning a monochromatic laser, or adjusting a monochrometer operating with a broadband source) to image each surface point at different wavelengths; as a sufficiently large number of wavelength images are obtained, a spectrum may be obtained for each surface point.

In another presently preferred embodiment, the light source is a broadband source utilized with an interferometer to modulate the broadband source radiation such that the modulation frequency is inversely proportional to the radiation wavelength. In this system, the micro-probe simultaneously detects radiation across the entire spectrum, with the micro-probe output signal being Fourier transformed to obtain the spectrum at each probe location as the micro-probe is scanned across the surface of interest and the spectral acquisition process repeated.

In yet another presently preferred embodiment, the radiation is provided by an x-ray source (which may be either of chopped monochromatic source nature, or of two x-ray energies, with one energy above and one energy below the k-edge of the atomic species of interest). Selective surface imaging of a chosen element is possible with appropriate control of source x-ray energy and, because of the high sensitivity of the micro-probe technique, a single atom of a given element should be localizable on the surface of interest.

Accordingly, it is an object of the present invention to provide novel scanning spectral analysis micro-probe subsystems for surface imaging systems.

This and other objects of the present invention will become apparent upon perusal of the following detailed descriptions, when considered in conjunction with the associated drawings.

DETAILED DESCRIPTION OF THE INVENTION

Figure 1:
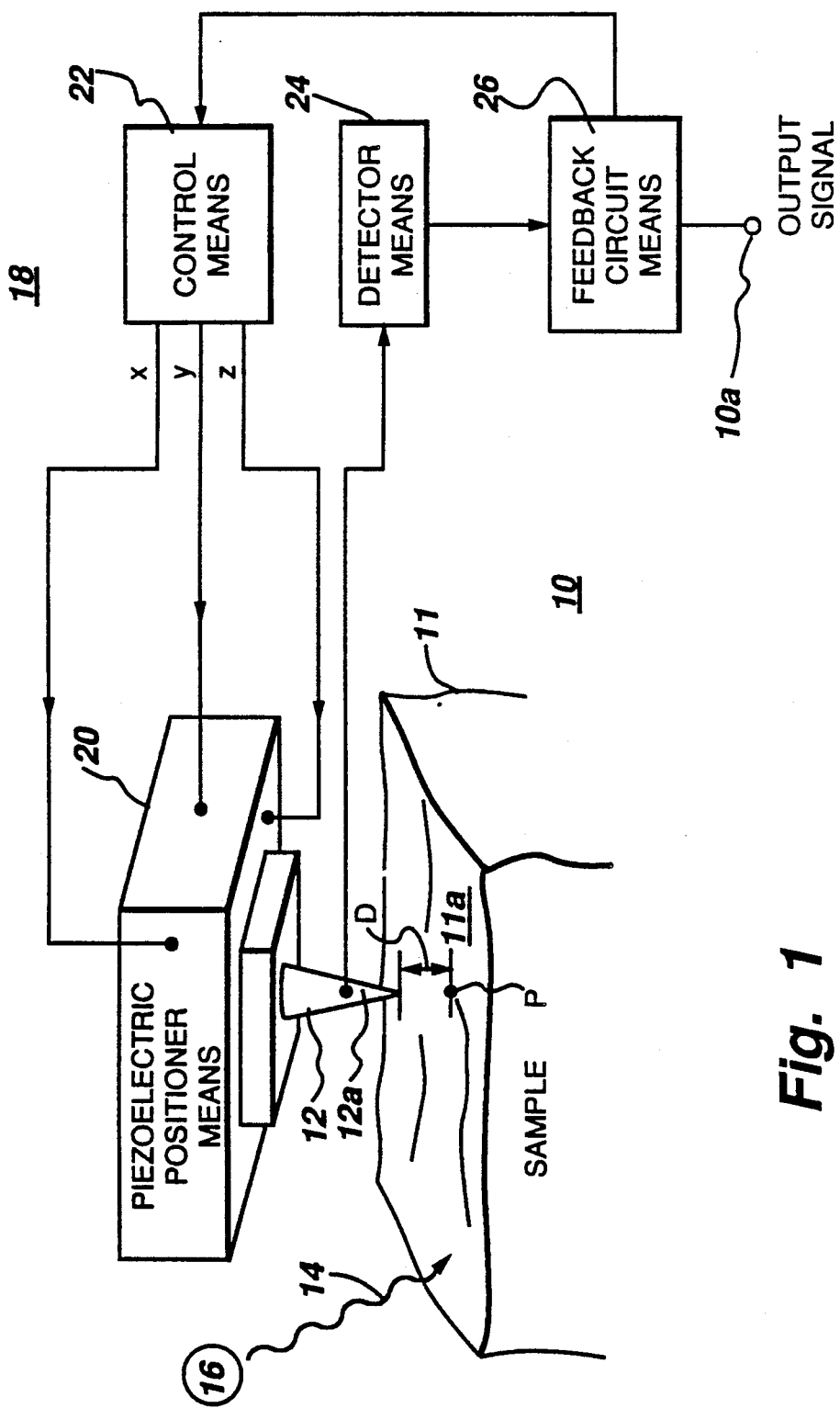
FIG. 1 is a schematic block diagram of a general micro-probe subsystem Of the invention.

Referring initially to FIG. 1, a scanning micro-probe subsystem 10 provides an output signal, at a front end output terminal 10a (for display upon known display portions not shown), which output signal is responsive to the separation distance D between a point P upon the surface 11a of a sample 11 and a tip 12a of a micro-probe 12. In accordance with the invention, probe 12 measures distance D (using techniques well known to the state of the art such as atomic force, tunnelling, and the like) as sample surface 11a is irradiated in at least the vicinity of (particularly at, and adjacent to) point P by a beam 14 of radiation from a radiation illumination source 16. The spectral response of that region about point P which absorbs the incident radiation 14, is thus detected. An absorption spectrum display of sample surface 11a can be provided by imaging the output signal at terminal 10a, as a movement means 18 causes probe 12 to move across sample surface 11a in some predetermined (e.g.raster-like) sweep. Movement means 18 includes a positioning means 20, such as a piezoelectric three-axis means for moving probe 12, as in the X-axis, Y-axis and Z-axis directions responsive to X, Y and/or Z signals from a control means 22. Probe 12 thus produces a signal, such as a current proportional to the amount of illumination 14 reflected from the point P being then imaged, to a detector means 24. The detector means provides an output signal to feedback circuit means 26, which not only provides the subsystem output signal at terminal 10a, but also provides a signal back to control means 22 for controlling the instantaneous location of micro-probe 12.

Figure 2:
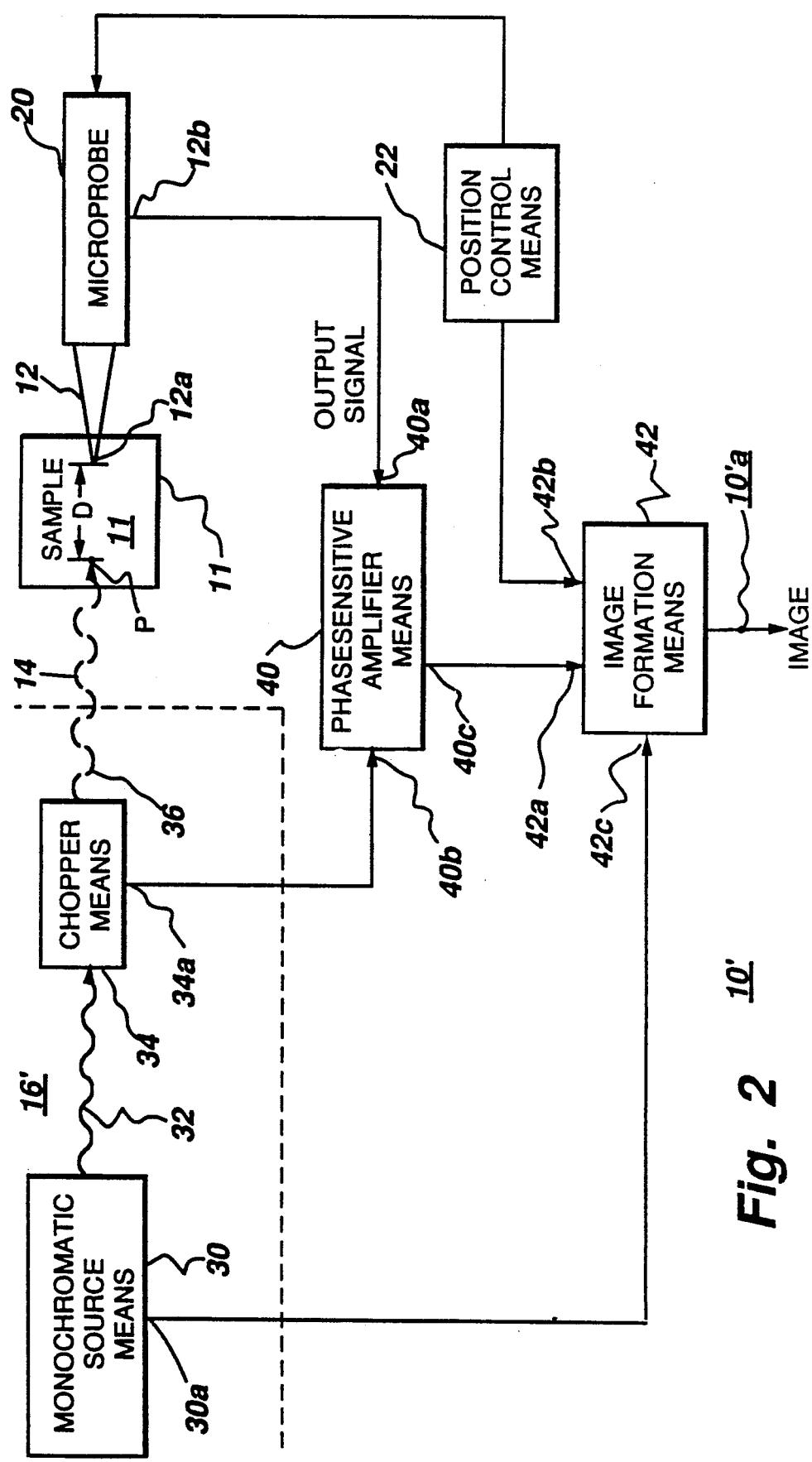
FIG. 2 is a schematic block diagram of a monochromatic micro-probe subsystem.

Referring now to FIGS. 1 and 2, having chosen the nature of the detector phenomenon (i.e. tunneling current, strain and the like) associated with the microprobe for optimum sample surface detection, the chromophore imaging system 10' can be implemented. Illumination source 16 comprises a monochromatic light source 30, such as a laser or a broadband source/-monochrometer and the like, which is used to generate a monochromatic light beam 32. Light beam 32 is periodically interrupted by a chopper means 34 to provide a chopped light beam 36, which forms the illumination beam 14, impinging upon point P of sample surface 11a; micro-probe 12 is directed at point P. The modulated light beam 36 causes a modulation in the sample surface 11a dimensions and this dimensional variation is detected by micro-probe 12. The micro-probe generates a signal from an output 12b; this is applied to a first input 40a of a phase-sensitive amplifier means 40, having a second input 40b receiving the interruption-producing signal from an output 34a of the chopper means. The phase-sensitive, or "lock-in", amplifier means provides a signal from output 40c which is proportional to the absorbance of the sample surface 11a at point P and at the chosen wavelength of beam 14. This absorbance-strength signal is applied to a first input 42a of an image formation means 42, having a second input 42b which receives position information from position control means 22, which also controls the position of the micro-probe position means 20. With the X and Y axis position information from position control means 22 provided at input 42b, and the distance, or Z-axis, data provided at input 42a, image formation means 42 provides in known manner the image output data at output 10'a. Advantageously, the incident radiation beam 32 wavelength is changed, as by adjusting a monochrometer associated with a broadband source, or by tuning the output frequency of a narrowband (laser) source, to obtain images at different wavelengths; the wavelength λ information can be sent from source output 30a to image formation means input at 42c, for storage/use, so that, if a sufficiently large number of wavelengths are utilized, a spectral image can be obtained for each point P on surface 11a.

Figure 3:
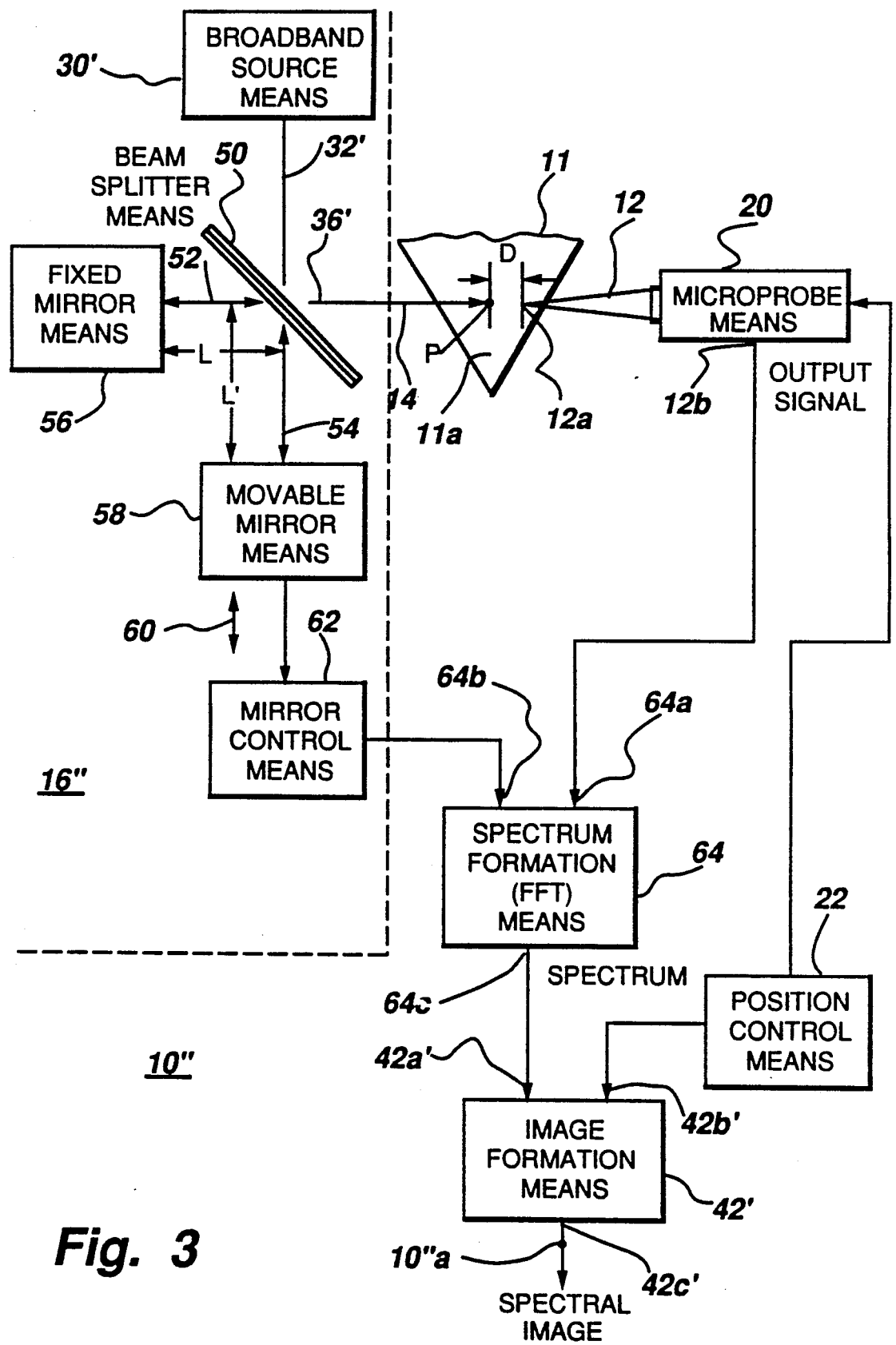
FIG. 3 is a schematic block diagram of another presently preferred embodiment, utilizing an interferometer in the surface illumination means.

Referring now to FIGS. 1 and 3, in another presently preferred embodiment, a spectroscopic micro-probe front end subsystem 10" utilizes an illumination source 16" which contains a broadband radiation source means 30' for producing a narrow beam 32' of radiation with a broad range of wavelengths. Beam 32' is directed upon a beam splitter means 50, such as a half-silvered mirror and the like, to provide first and second output beams 52 and 54, respectively. Beam 52 is reflected from a fixed mirror means 56, which returns substantially all of the beam 52 illumination to beam splitter means 50, over a path of length L. Beam 54 is substantially entirely reflected by a mirror means 58, moveable in the direction of arrows 60 by a mirror control means 62; at any instant, the path from splitter means 50 to moveable mirror means 58 has a length L'. Depending upon the difference in length L' and length L, in quarter-wavelengths, interference phenomenon will occur in incident light, depending upon the particular wavelength light in beam 32'. Thus, the beam 36' of light resulting from reflected beams 52 and 54 is interference-modulated, with a modulation frequency which is inversely proportional to the wavelength of the incident radiation. This broadband, modulated radiation spectrum is incident upon the point P of sample surface 11a; micro-probe 12 simultaneous detects modulation over the entire broadband spectrum. The signal at microprobe output 12b is provided to a first input 64a of a spectrum formation, or fast Fourier transform (FFT) means 64, receiving mirror positioning information at another input 64b from mirror control means 62. Responsive thereto, the microprobe output signal is Fourier transformed to give the entire radiation-responsive spectrum at location P; as the surface 11a of interest is scanned by a micro-probe, responsive to operation of positioning means 20 and position control means 22, the spectrum of the entire surface can be acquired. The spectrum information is applied to a first input 42a' for an image formation means 42', receiving the position control information at input 42b', so that spectral information for the entire sample surface 11a is provided at front end output 10"a.

It will be seen that various wavelengths can be advantageously utilized. In one particular embodiment, the radiation source is in the x-ray portion of the electromagnetic spectrum. Illumination can be a chopped monochromatic x-ray source (utilizing the front end system 10' of FIG. 2) or it can be a "broadband" source in which two different x-ray energies are utilized, with the first energy being above the k-edge of the atomic species of interest and the other x-ray energy being below the k-edge of the that species. By properly controlling the x-ray energy, selected surface imaging of a chosen element is possible and, due to the high sensitivity attainable with micro-probe techniques, it is possible to localize a single atom of a chosen element upon the sample surface 11a of interest.

While several presently preferred embodiments of my novel scanning spectral-analysis micro-probe imaging system have been described in detail herein, many modification and verifications will now become apparent to those skilled in the art. It is my intent, therefore, to be limited only by the scope of the impending claims, and not by the specific details and instrument abilities utilized in the description of these exemplary embodiments.

What is claimed is:

1. A scanning micro-probe subsystem, for use in a system for imaging a surface of a sample, comprising:
 a micro-probe having a tip;
 means for positioning the micro-probe tip in direct contact with at least one selected point P upon said sample surface;

means for illuminating said surface with a beam of radiation having at least one wavelength to cause a modulation of said surface toward the tip, so as to cause a strain force to be exerted between the tip and said point P when the beam is absorbed; and when the beam is absorbed; and means for measuring the strain force between said tip and said point P, responsive to the modulation of said surface, in at least the vicinity of point P, the measuring means including:

a) means for varying the at least one wavelength of the illuminating beam of radiation including interferometer means for modulating the beam of radiation at a frequency inversely proportional to the incident radiation, and b) means for providing displayable spectral information from each point analyzed allowing spectroscopic analysis of one or more atoms at point P.

2. The subsystem of claim 1, wherein said means for illuminating is modulated in a manner to cause at least one dimension of the surface about point P to vary and be measured with a resolution that can be greater than the wavelength of the illuminating radiation.

3. The subsystem of claim 2, wherein the illuminating means includes means for providing a substantially monochromatic radiation beam.

4. The subsystem of claim 3, wherein the providing means is a laser.

5. The subsystem of claim 3, wherein the providing means includes: a source of broadband radiation; and monochrometer means for selecting only a narrow wavelength range of the broad band radiation.

6. The subsystem of claim 3, wherein the measuring means includes phase-sensitive means for acquiring absorption-strength information.

7. The subsystem of claim 1 wherein the positioning means includes means for scanning the micro-probe across a portion of the surface.

8. The subsystem of claim 1, wherein the measuring means includes: means for varying the wavelength of the illuminating radiation; and means for providing displayable spectral information from each point analyzed.

9. The subsystem of claim 8, wherein the information providing means includes means for performing a fast Fourier transformation upon the measured strain forces, to obtain a spectrum at each point P.

10. The subsystem of claim 3, wherein the means for illuminating an x-ray source.

11. The subsystem of claim 10, wherein the means for illuminating provides x-rays of substantially one energy.

12. The subsystem of claim 10, wherein the means for illuminates provides x-rays of at least two different energy levels.

13. The subsystem of claim 12, wherein at least one energy is above a k-edge of a chosen atomic species and at least one energy is below the k-edge of that species.

14. The subsystem of claim 8, wherein the wavelength employed is a wavelength specifically absorbed by predetermined atoms on the surface of said sample, causing selective imaging of said surface.

15. A scanning micro-probe subsystem for use in a system for imaging a surface of a sample, comprising:

a micro-probe having a tip;

means for positioning the micro-probe tip to establish a gap of distance D between at least one selected point P upon said sample surface and the tip;

means for illuminating said surface with a beam of radiation having at least one wavelength to cause a modulation of said surface toward the tip, so as to decrease the distance D when the beam is absorbed; and means for measuring distance D by causing a tunneling current to be passed between point P and the tip and measuring the tunneling current, the measuring means being responsive to the modulation of said surface in at least the vicinity of point P, the measuring means including:

a) means for varying the at least one wavelength of the illuminating beam of radiation including interferometer means for modulating the beam of radiation at a frequency inversely proportional to the incident radiation, and b) means for providing displayable spectral information from one or more atoms at point P, allowing spectroscopic analysis of said surface at point P.

16. The subsystem of claim 15 wherein said measuring mean includes means for illuminating said surface with a beam of radiation modulated in a manner to cause at least one dimension of the region about point P to vary and be measurable with a resolution that can be greater than the wavelength of the illuminating radiation.

17. The subsystem of claim 16 wherein the illuminating means includes means for providing a substantially monochromatic radiation beam.

18. The subsystem of claim 17 wherein the beam providing means is a laser.

19. The subsystem of claim 17 wherein the beam providing means includes: a source or broadband radiation; and monochrometer means for selecting only a narrow wavelength range of the broad band radiation.

20. The subsystem of claim 17 wherein the measuring means includes phase-sensitive means for acquiring absorption-strength information.

21. The subsystem of claim 15 wherein the positioning means includes means for scanning the micro-probe across a portion of the surface.

22. The subsystem of claim 15 wherein the measuring means includes: means for varying the wavelength of the illuminating radiation; and means for providing displayable spectral information from each point analyzed.

23. The subsystem of claim 22 wherein the information providing means includes means for performing a fast Fourier transformation upon the distance data, to obtain a spectrum at each point P.

24. The subsystem of claim 17 wherein the means for illuminating is an x-ray source.

25. The subsystem of claim 24 wherein the means for illuminating provides x-rays of substantially one energy.

26. The subsystem of claim 24 wherein the means for illuminating provides x-rays of at least two different energy levels.

27. The subsystem of claim 26 wherein at least one energy is above a k-edge of a chosen atomic species and at least one energy is below the k-edge of that species.

* * * * *